(No Model.) 2 Sheets—Sheet 1.
A. S. GOODELL.
MACHINE FOR MAKING EYEBOLTS.
No. 304,636. Patented Sept. 2, 1884.
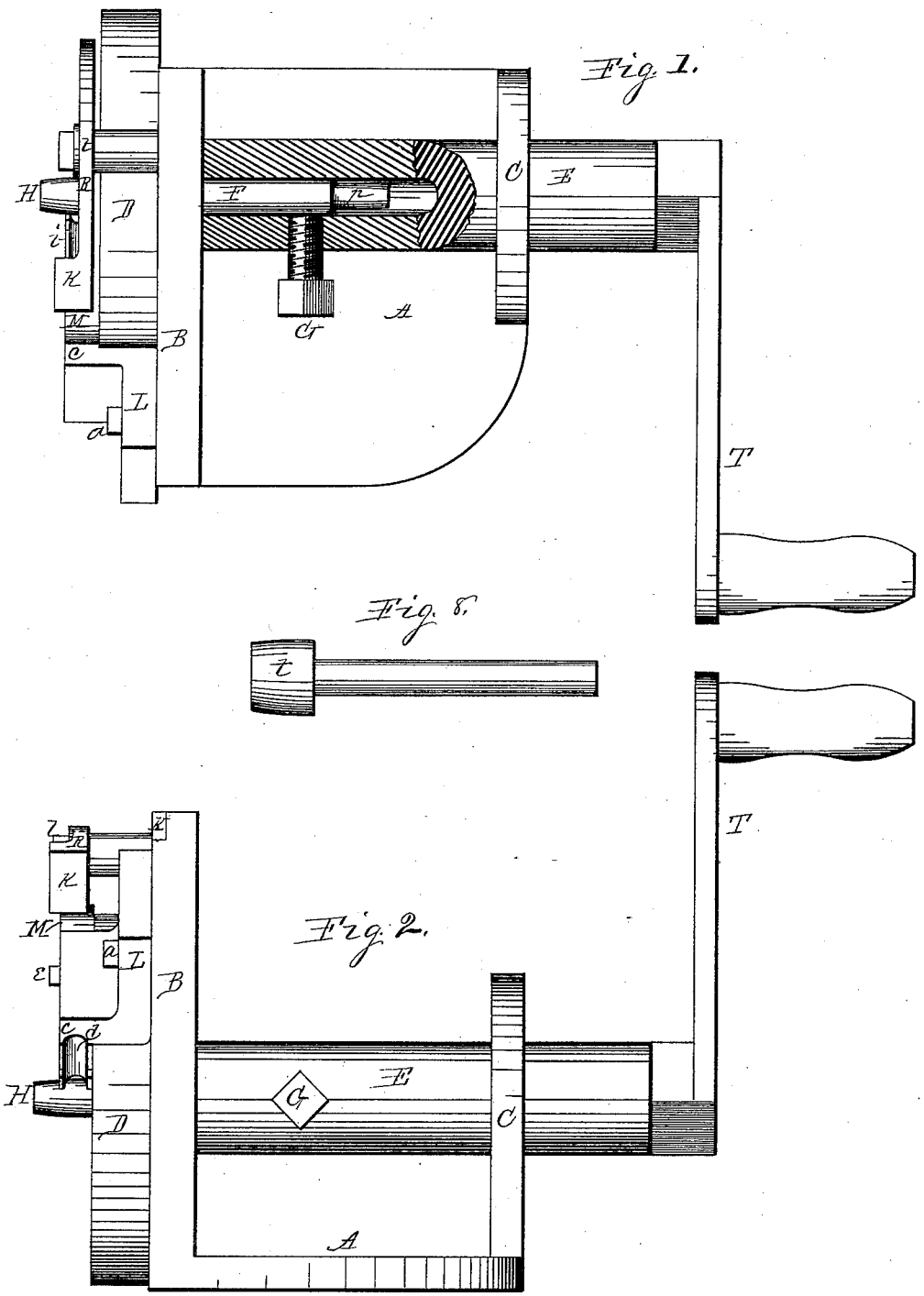
Witnesses.
E. O. Darling.
A. O. Behel.
Inventor.
Andrew S. Goodell,
Per Jacob Behel,
Atty.

(No Model.)
2 Sheets—Sheet 2.
A. S. GOODELL.
MACHINE FOR MAKING EYEBOLTS.
No. 304,636. Patented Sept. 2, 1884.
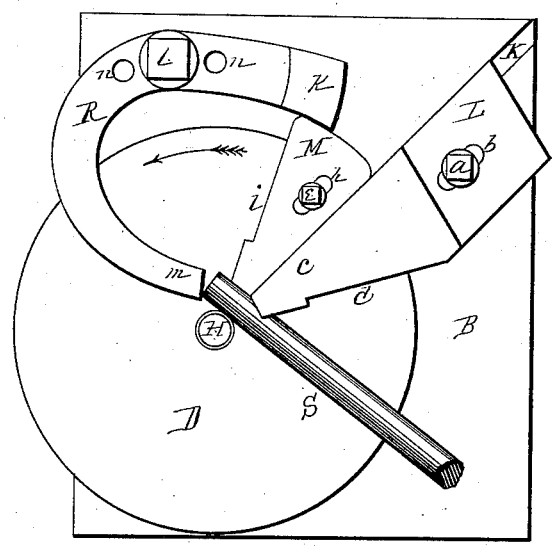
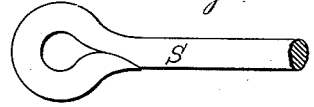
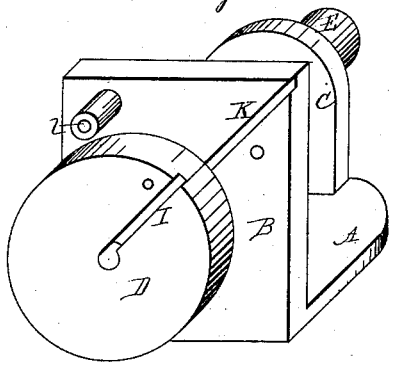
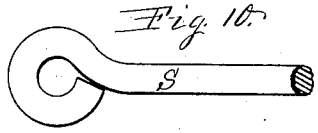
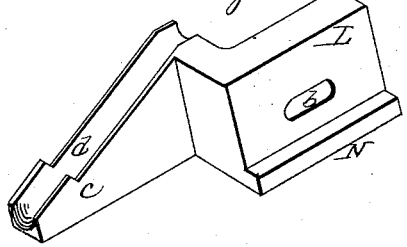
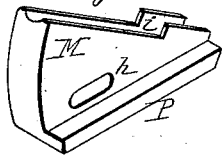
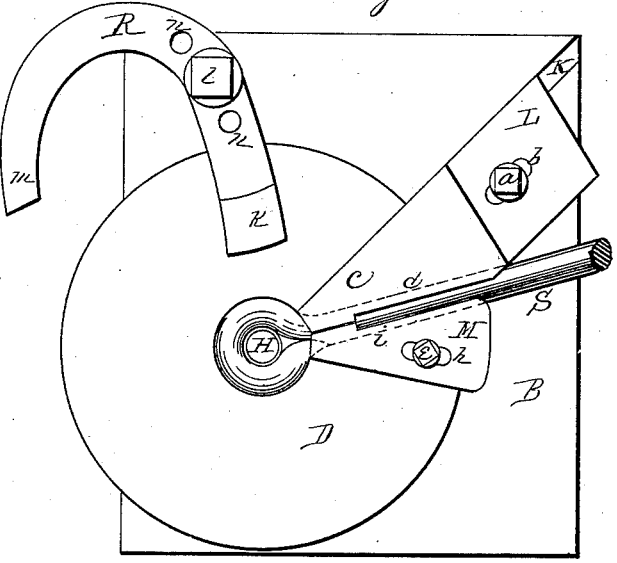
Witnesses.
E. O. Darling
A O Behel
Inventor.
Andrew S. Goodell
Per Jacob Behel
Atty

UNITED STATES PATENT OFFICE.

ANDREW S. GOODELL, OF ROCKFORD, ILLINOIS, ASSIGNOR TO PETER SAMES, OF SAME PLACE.

MACHINE FOR MAKING EYEBOLTS.

SPECIFICATION forming part of Letters Patent No. 304,636, dated September 2, 1884.

Application filed June 8, 1883. (No model.)

*To all whom it may concern:*

Be it known that I, ANDREW S. GOODELL, a citizen of the United States, residing in the city of Rockford, in the county of Winnebago and State of Illinois, have invented a new and useful Eye-Machine, of which the following is a specification.

This invention relates to the manufacture of eyes from metallic rods or bars—such as eye-rods, eyebolts, and screw-eyes; and its object is to bend or form and weld such eyes at one operation rapidly. To this end I have designed, arranged, and constructed the machine represented in the accompanying drawings, in which—

Figure 1 is a plan view of my improved eye bending and welding machine. Fig. 2 is a front side elevation. Fig. 3 is a face elevation with the parts in position to receive the rod or bar from which to produce the eye. Fig. 4 is a face elevation with the parts in position with the eye finished. Fig. 5 is an isometrical representation of the supporting-frame and disk-head on a reduced scale. Figures from 6 to 10, inclusive, represent parts in detail.

The supporting-frame of my improved eye forming and welding machine consists of a horizontal bed-plate, A, a vertical head or face plate, B, and a vertical tail-plate, C, in this instance produced of cast-iron in one piece, and the vertical head and tail plates are bored, forming bearings to receive a horizontal shaft to oscillate therein.

At D is represented a disk-formed head or face plate, from the center of which, on one side, is extended a shaft, E, fitted to enter and oscillate in the hole-bearings formed in the vertical plates B and C. This disk plate or head and the end portion of the shaft connected therewith are centrally bored, producing an axial opening to receive a center-pin, F, made removable, and held in place by means of a set-screw, G, having a screw-threaded connection with the shaft, in position to engage the center-pin to fix it in place. The end portion, H, of the center-pin projects from the face of the disk plate or head a distance, substantially equal to the diameter of the material from which the eye is to be produced, and its diameter is equal to the diameter of the eye to be produced.

At I in the disk-head D and at K in the vertical head-plate B are represented radial grooves employed to give position to the radial bending and welding jaws L and M.

The jaw represented at L is of a conformation to engage the outer face of the vertical head-plate B of the frame, having a rib, N, projecting from its inner face side to enter the radial groove K in the vertical head, and is held in place thereon and made adjustable toward and from the center of the disk by means of a screw-clamping bolt, *a*, passed through a slotted opening, *b*, formed in the jaw, and screw-threaded into the vertical head. The free arm *c* of this jaw projects from the face of the head and is of sectoral form, and extends in a radial line over the face of the disk toward its center, and its edge *d* is produced in grooved form lengthwise, semicircular in section.

The jaw M is of sectoral form, provided with a rib, P, projecting from its inner face to enter the radial groove I in the disk-head, and is held in place thereon, and made adjustable toward and from the center of the disk by means of a screw-clamping bolt, *e*, passed through a slotted opening, *h*, formed in the jaw, and screw-threaded into the disk-head, and its edge *i* is provided with a lengthwise groove semicircular in section. The under ends of these sector-formed jaws L and M in the grooved faces are curved outward to coincide with the dotted lines N and *i* in Fig. 4, to embrace the shank of the eye, in the manner therein shown, to produce a welded eye, as represented in Fig. 9.

At R is represented a gage produced in horseshoe form, one end of which, as at *k*, is enlarged or weighted. This gage is centrally pivoted at *l* to the vertical head-plate B in such position thereon that when its weighted end rests on the outer end of the jaw M, fixed to the disk-head, as represented in Fig. 3, its point or gage end *m* will be in position to receive the end of the rod S, from which to form the eye and limit its endwise movement when placed in the machine, and gage the length of bar or quantity of material necessary to produce the lap-weld of the completed eye. This gage is made adjustable on its pivotal connection with the vertical head-plate by means of a series of holes, *n*, formed in its central portion in such order as to adapt the machine to produce eyes varying in size from different-sized bars or rods. The construction of this curved gage and its position relatively with the jaw M on the disk-head are such that when the jaws are in their open position, as represented in Fig. 3, to receive the rod or bar, its weighted end will rest on the peripheral surface of the jaw M, and when the disk-head is made to rotate in the direction of the arrow thereon, the peripheral end of the jaw M, carried with the disk, will pass from under the weighted arm, and will engage the inner surface of arm m, and, in connection with the weighted arm k, will carry the gage-arm to the position shown in Fig. 4, and the return movement of the disk will cause the peripheral end of the jaw M to engage the weighted arm and return the parts to their open position, as in Fig. 3.

At T is represented a hand-crank or winch fixed on the end of the shaft E, by means of which an attendant is enabled to impart motion to the disk in either direction.

The operation of the machine is as follows: After securing the proper adjustment of the parts, as shown in Fig. 3, the end of the bar or rod S, from which the eye is to be formed, is brought to a welding-heat, and is then placed in the machine, as is illustrated in Fig. 3, between the inner end of the jaws and the center-pin, with its end against the end m of the gage. The disk D is then moved in the direction of the arrow by means of the crank, carrying with it the center-pin H and the jaw M. In this movement the heated end of the bar S, thus placed in the machine, will be grasped and held between the inner end of the jaw M and center-pin in such a manner as to be carried with the movement of the jaw M and center pin, both of which are carried with the movement of the disk D in the direction indicated by the arrow. This movement of the disk D, jaw M, and center-pin H will bend and wind the heated rod or bar S, causing the rod to slip, slide, or render under the inner end of the free arm c of the fixed jaw L in a manner to give sufficient length of rod to form the eye on the pin, until the end of the heated rod S, held between the jaw M and the center pin, is brought to engage the rod or shank of the eye, after which the further movement of the disk in the direction indicated by the arrow will compress and weld the end of the rod held between the jaw M and pin to the rod or shank portion of the eye by compression between the movable jaw M and the fixed jaw L in the manner shown in Fig. 4, which operation will produce the complete eye, as represented at Fig. 9, removed from the machine. The reverse movement of the disk will permit the completed eye, as represented at Fig. 9, to be removed from the machine, and will place the parts in position for a second operation. The center-pin F in the machine is made removable, and its inner end at p is reduced to fit it for the manufacture of smaller eyes.

At Fig. 8 is represented a form of center-pin having its end portion at t enlarged, and is of a form designed for use in the machine in the manufacture of eyes having a greater diameter. These center-pins may be produced in any required variety in size to produce eyes to meet the requirements of the trade; and, for the purpose of producing eyes from material having a greater or less diameter, jaws having grooved edges fitted for the purpose are provided, to be employed in the same manner as those represented in the machine.

In the foregoing I have represented my machine mainly as a bending and welding machine; but it is capable of adjustment to produce cold-shut eyes, as represented at Fig. 10, in which instance the adjustment of the gage is such as to regulate the quantity of material necessary to produce a cold-shut eye having its end engage the shank snugly when properly bent by the machine.

From the foregoing it will be seen that the center-pin revolves with the disk-head, and that in the production of the eye the bar is wound upon the center-pin with a slipping action thereon, being held in connection therewith by the jaw fixed to the disk-head, and having a fixed position on the head relatively to the center-pin, both of which have a unison of movement with the head.

I claim as my invention—

1. The combination, with the vertical head-plate of the machine, of a jaw adjustably secured thereto, an oscillating link overlapped by said jaw, and having a projecting center, and an adjustable jaw secured upon said disk, and adapted to bend the eye and to come in contact with the overlapping jaw at the limit of oscillation, to weld the eye, substantially as set forth.

2. The combination, with the oscillating disk and its adjustable bending-jaw, of a curved gage pivoted to the head-plate of the machine, and adapted to engage one end of said jaw and to receive the end of the rod, substantially as set forth.

3. The combination, with a jaw and center-pin projecting from the face of a disk capable of an oscillatory movement about its axis, of a fixed jaw located in the plane of the oscillatory jaw, said jaws having grooved edges to clamp and weld the eye, substantially in the manner specified.

4. The combination, substantially as herein described, of a disk capable of an oscillatory movement about its axis, a reversible center-pin, a jaw projecting from the face of the disk and made adjustable thereon, a jaw having a fixed position relatively with the disk and made adjustable, and a pivoted gage made adjustable on its pivot-support, these several parts constructed and arranged to operate substantially as set forth.

ANDREW S. GOODELL.

Witnesses:
JNO. D. WATERMAN,
A. O. BEHEL.